(No Model.)

C. LIE.
FISH HOOK.

No. 330,793. Patented Nov. 17, 1885.

WITNESSES:
John H. Kreemer
C. Sedgwick

INVENTOR:
C. Lie
BY Munn & Co
ATTORNEYS.

UNITED STATES PATENT OFFICE.

CORNELIUS LIE, OF TRONDHJEM, NORWAY.

FISH-HOOK.

SPECIFICATION forming part of Letters Patent No. 330,793, dated November 17, 1885.

Application filed August 14, 1885. Serial No. 174,411. (No model.)

*To all whom it may concern:*

Be it known that I, CORNELIUS LIE, of Trondhjem, Norway, have invented a new and Improved Fish-Hook, of which the following is a full, clear, and exact description.

My invention relates to that class of fish-hooks in which a pivoted hook is concealed in an artificial bait, which is adapted to be attached to a fishing-line; and has for its object to provide a combined hook and bait simple in construction, alluring in appearance, and effective in operation.

The invention consists in an artificial bait having a bar to slide longitudinally therein, and in hooks pivoted in the bait to the bar and provided with slots engaging a fixed part of the bait, the said parts being so constructed and arranged that the points of said hooks will be projected from the bait when the bar is moved by tension on the line to which it is attached, as will be hereinafter more particularly described, and then claimed.

Reference is to be had to the accompanying drawings, forming part of this specification, in which similar letters of reference indicate corresponding parts in all the figures.

Figure 2:
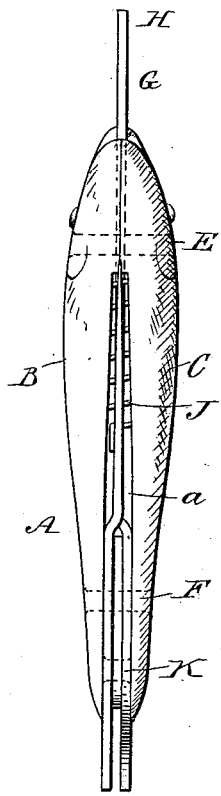
Figure 3:
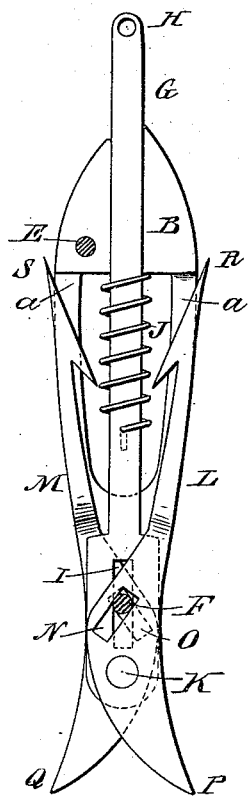
Figure 1:
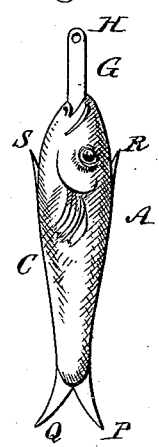

Figure 1 is a side view of my improved fish-hook. Fig. 2 is an edge view of the same enlarged. Fig. 3 is a side view of the same enlarged, having one half of the artificial fish removed and showing the rivets in cross-section.

A indicates a body of an artificial fish, which may be of any desired size, and may be shaped and colored to represent any variety of fish likely to attract the game sought. The body may be made of wood, metal, rubber, paper, or any suitable material, and is composed of two separate parts, B and C, which are hollowed out and also cut away on their meeting faces, as at *a*, sufficiently to contain the hooks and working mechanism. The parts B and C are fastened together by the rivets E and F at the head and tail of the fish, respectively. In Fig. 3 the part C is removed, showing the inner side of part B and working mechanism.

A flat bar, G, passes through the entire length of the fish, and is provided at its outer end with an eye, H, adapted to receive the fishing-line. The inner end of the bar G is enlarged, and has the slot I formed in it, through which passes the rivet F. A spring, J, surrounds the central part of the bar G, is fastened to the bar at one end, and has its other end rested against the solid portion of the parts B and C at the head of the fish. The action of the said spring is to force the bar G downward. Two fish-hooks, L and M, are pivoted to the bar G, one on each side and below the slot I, by the pivot K. The said hooks are of the ordinary pattern, and are provided at a short distance above the pivot K with the diagonal slots N and O, respectively, which receive the rivet or pin F. By this construction the spring J, acting on the bar G, forces it downward, and hence also causes the fish-hooks to remain concealed in the body of the fish in the normal position as represented in the figures. When, however, the bar G is drawn outward or upward, it acts also upon the hooks L and M by means of the pivot K, whereby the said hooks are also drawn upward, and the rivet F, acting in the slots N and O, forces the points of the hooks outward. The greater the tension on the fishing-line the farther out will the points of the hooks be thrown and the game more securely attached to the bait.

When it is desired to release the hooks, the bar G is pressed downward, whereby the hooks are brought back within the body of the bait. The rear ends of the hooks L and M are curved, as at P and Q, to form a homocercal tail.

When the bait is thrown, the artificial fish shows nothing of the hooks save the very points R and S, which represent fins and the tail-pieces P and Q. If desired, the body A may be weighted in order to make it sink more readily.

The mechanism shown may also be applied with very slight modification to flies, worms, or other form of bait.

The lower part of the artificial bait may be painted with luminous paint in order to give it a more natural and life-like appearance, and so that it will attract the game as it flashes through the water.

It will be observed that when the fish closes his mouth over the bait pressure will be brought to bear upon the tail of the artificial fish, and the points of the hooks will be spread out and catch firm hold upon the game.

Having thus described my invention, what I claim as new, and desire to secure by Letters Patent, is—

1. The combination, with an artificial bait, of a bar held in the same to have longitudinal movement, of two hooks pivoted to said bar and having diagonal slots to receive a fixed part of said bait, and of a spring acting on said bar, substantially as shown and described, whereby the hooks are normally held within the bait and projected therefrom when tension is put on a line to which the bait is attached, as set forth.

2. The combination, with an artificial bait, of a bar having its outer end adapted for attachment to a fish-line and slotted near its inner end, two hooks pivoted at their lower ends to the inner end of the said bar and provided each with a diagonal slot, a pin or rivet passing through the said bait and through the slots in the bar and hooks, and of a spring attached to said bar and taking against the head end of the bait, substantially as shown and described.

3. The combination, with the bait A, of the bar G, having slot I, the hooks L and M, pivoted at K to said bar and provided with the slots N and O, respectively, the rivet F, and the spring J, substantially as shown and described.

4. The combination, with the artificial bait A, painted with luminous paint, of the bar G, held to have longitudinal movement in said bait, the hooks L and M, having diagonal slots, the spring J, and the rivet or pin F, substantially as shown and described.

5. A combined artificial bait and hook consisting, essentially, of the slotted body A, the bar G, having slot I, the hooks L and M, pivoted to the inner end of bar G and having the diagonal slots N O, the pin or rivet F, and the spring J, all constructed and arranged substantially as shown and described, and for operation as set forth.

CORNELIUS LIE.

Witnesses:
JOHS. HOLST,
TH. KIMDHJON.